United States Patent
Ham et al.

(10) Patent No.: US 12,010,074 B2
(45) Date of Patent: Jun. 11, 2024

(54) ELECTRONIC APPARATUS FOR RESPONDING TO QUESTION USING MULTI CHAT-BOT AND CONTROL METHOD THEREOF

(71) Applicant: SAMSUNG ELECTRONICS CO., LTD., Suwon-si (KR)

(72) Inventors: Jina Ham, Suwon-si (KR); Wonjong Choi, Suwon-si (KR); Soofeel Kim, Suwon-si (KR); Yewon Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 159 days.

(21) Appl. No.: 17/578,088

(22) Filed: Jan. 18, 2022

(65) Prior Publication Data

US 2022/0141160 A1 May 5, 2022

Related U.S. Application Data

(63) Continuation of application No. PCT/KR2021/012270, filed on Sep. 9, 2021.

(30) Foreign Application Priority Data

Oct. 8, 2020 (KR) .................. 10-2020-0130313

(51) Int. Cl.
*H04L 51/02* (2022.01)
*G06F 16/33* (2019.01)
(Continued)

(52) U.S. Cl.
CPC .......... *H04L 51/02* (2013.01); *G06F 16/3329* (2019.01); *G06F 16/334* (2019.01); *G06F 16/35* (2019.01)

(58) Field of Classification Search
CPC ..... H04L 51/04; H04L 51/02; G06F 16/3329; G06F 16/334; G06F 16/35; G06F 16/955; G06N 20/00
See application file for complete search history.

(56) References Cited

U.S. PATENT DOCUMENTS

| 9,990,591 B2 | 6/2018 | Gelfenbeyn et al. |
| 10,514,888 B1 * | 12/2019 | Rodgers .................. G10L 25/78 |

(Continued)

FOREIGN PATENT DOCUMENTS

| KR | 10-2019-0057687 A | 5/2019 |
| KR | 10-2019-0099761 A | 8/2019 |

(Continued)

OTHER PUBLICATIONS

International Search Report dated Dec. 16, 2021 issued by the International Searching Authority in International Application No. PCT/KR2021/012270 (PCT/ISA/210).

(Continued)

*Primary Examiner* — Hitesh Patel
*Assistant Examiner* — Vinh Nguyen
(74) *Attorney, Agent, or Firm* — Sughrue Mion, PLLC

(57) ABSTRACT

An electronic apparatus includes a memory storing instructions, a plurality of chat-bots for responding to a plurality of questions, and a question classification model trained to identify a chat-bot among the plurality of chat-bots for responding to an input question, and a processor configured to execute the instructions to input the input question into the question classification model, the question classification model outputting a first chat-bot among the plurality of chat-bots for responding to the input question, acquire a first response for the input question, through the outputted first chat-bot, based on the acquired first response comprising information of a function that can be performed at the (Continued)

electronic apparatus, generate a question requesting to perform the function, and input the generated question into the question classification model, the question classification model outputting a second chat-bot among the plurality of chat-bots for responding to the generated question.

11 Claims, 13 Drawing Sheets

(51) Int. Cl.
  *G06F 16/332* (2019.01)
  *G06F 16/35* (2019.01)

(56) References Cited

U.S. PATENT DOCUMENTS

| | | | |
|---|---|---|---|
| 10,629,191 | B1 | 4/2020 | Cheng et al. |
| 10,757,044 | B2 | 8/2020 | Fawcett |
| 10,771,408 | B2 | 9/2020 | Lim et al. |
| 10,789,040 | B1* | 9/2020 | Silvester ............... G06F 3/165 |
| 10,963,458 | B2 | 3/2021 | Kolluri Venkata Sesha et al. |
| 11,024,304 | B1* | 6/2021 | Smith .................... G10L 15/22 |
| 11,086,644 | B1* | 8/2021 | Balaram ............. G06F 16/245 |
| 11,170,778 | B2 | 11/2021 | Jun |
| 2018/0025085 | A1 | 1/2018 | Sarangi et al. |
| 2018/0181558 | A1* | 6/2018 | Emery .................... H04L 51/02 |
| 2018/0227417 | A1* | 8/2018 | Segalis ............. G10L 15/1807 |
| 2018/0285752 | A1 | 10/2018 | Yu et al. |
| 2018/0287968 | A1 | 10/2018 | Koukoumidis et al. |
| 2019/0147880 | A1* | 5/2019 | Booker ................... G06F 3/167 704/251 |
| 2019/0158433 | A1* | 5/2019 | Yun ....................... G06F 40/279 |
| 2019/0199658 | A1 | 6/2019 | Kim et al. |
| 2019/0258456 | A1 | 8/2019 | Byun et al. |
| 2020/0028803 | A1 | 1/2020 | Helmy |
| 2020/0111490 | A1 | 4/2020 | Jang et al. |
| 2020/0388285 | A1* | 12/2020 | Spiewla .................. G10L 15/22 |
| 2021/0005189 | A1* | 1/2021 | VanBlon ........... H04M 1/72403 |
| 2021/0048930 | A1* | 2/2021 | Chow ............... H04M 1/72436 |
| 2021/0058844 | A1* | 2/2021 | Ringhiser ............... G06F 9/453 |
| 2021/0067470 | A1* | 3/2021 | Freed ...................... G06F 18/23 |
| 2021/0072825 | A1* | 3/2021 | Deleeuw .............. G06V 10/143 |
| 2021/0119944 | A1* | 4/2021 | Kim ....................... G06F 40/35 |
| 2021/0182341 | A1* | 6/2021 | Mullins ................ G06F 16/951 |
| 2021/0200598 | A1* | 7/2021 | Barczyk ................ G06F 9/5055 |
| 2021/0217406 | A1* | 7/2021 | Jang ..................... G10L 15/063 |
| 2021/0304772 | A1* | 9/2021 | Shetty ..................... G06F 3/167 |
| 2021/0365482 | A1* | 11/2021 | Kim ...................... G06Q 50/10 |
| 2021/0409363 | A1* | 12/2021 | Neumann .............. H04L 51/02 |
| 2022/0076668 | A1* | 3/2022 | Carbune ............. G10L 15/063 |

FOREIGN PATENT DOCUMENTS

| | | |
|---|---|---|
| KR | 10-2019-0114326 A | 10/2019 |
| KR | 10-2020-0034430 A | 3/2020 |
| KR | 10-2104503 B1 | 4/2020 |
| KR | 10-2020-0085143 A | 7/2020 |

OTHER PUBLICATIONS

Written Opinion dated Dec. 16, 2021 issued by the International Searching Authority in International Application No. PCT/KR2021/012270 (PCT/ISA/237).

Mingyue Shang et al., "Semi-supervised Text Style Transfer: Cross Projection in Latent Space", arXiv:1909.11493v1, Sep. 2019, 10 pages total, https://arxiv.org/pdf/1909.11493.

Sangeeta et al., "Enhancing College Chat Bot Assistant with the Help of Richer Human Computer Interaction and Speech Recognition", Proceedings of the International Conference on Electronics and Sustainable Communication Systems (ICESC 2020), Jul. 2, 2020, pp. 427-433, doi:10.1109/ICESC48915.2020.9155951, XP033805634.

Communication dated Jan. 3, 2024 issued by the European Patent Office in European Patent Application No. 21877861.1.

* cited by examiner

ELECTRONIC APPARATUS FOR RESPONDING TO QUESTION USING MULTI CHAT-BOT AND CONTROL METHOD THEREOF

CROSS-REFERENCE TO RELATED APPLICATIONS

This application is a bypass continuation of International Application No. PCT/KR2021/012270, filed on Sep. 9, 2021, which is based on and claims priority to Korean Patent Application No. 10-2020-0130313, filed on Oct. 8, 2020, in the Korean Intellectual Property Office, the disclosures of which are incorporated by reference herein in their entireties.

BACKGROUND

1. Field

The disclosure relates to an electronic apparatus that responds to a question, and more particularly, to an electronic apparatus that provides a response by selectively using a plurality of chat-bots.

2. Description of Related Art

In a multi chat-bot environment in which a plurality of chat-bots providing different services from one another are used, if a user's question is input, a response and a function are provided through any one chat-bot selected.

In case a response provided through a selected chat-bot includes information on a function, even though the function can be automatically performed through another chat-bot, only the response of the selected chat-bot is provided. As a result, an inconvenient circumstance wherein a user has to directly perform the function may occur.

This is due to the fact that, as each chat-bot provides a different service, there are many cases wherein each chat-bot is developed/updated independently.

Even though such a problem could be overcome if responses/functions of different chat-bots are interlocked with one another one by one, in this case, there may be a problem that the process of developing/updating each chat-bot becomes too cumbersome.

FIG. 1 is a diagram for illustrating an example of an operation of a multi chat-bot environment according to the related art.

FIG. 1 illustrates a user 10 of an electronic apparatus (ex. a smartphone) and an artificial intelligence (AI) assistant 20 that provides services based on multi chat-bots through the electronic apparatus.

The AI assistant 20 may be defined as a voice assistant that provides comprehensive services, and referring to FIG. 1, the AI assistant 20 may use a customer service chat-bot 20-1, a settings chat-bot 20-2, a weather chat-bot 20-3, etc.

Referring to FIG. 1, in case the user 10 asked a question "The Internet connection is not working" 11, the customer service chat-bot 20-1 among the chat-bots of the AI assistant 20 may be selected.

Then, the customer service chat-bot 20-1 may provide a response 21 to the user's question 11 as in FIG. 1.

Referring to FIG. 1, the customer service chat-bot 20-1 just provides a response 21 informing what is the currently needed function (mobile data>turn on) is, and it cannot directly perform the corresponding function.

In this case, even if it is possible to automatically provide the corresponding function (mobile data>turn on) through the setting chat-bot 20-2, it may be difficult to use the setting chat-bot 20-2 that was not selected.

As a result, the user cannot help activating the corresponding function (mobile data>turn on) directly through a manual operation for the electronic apparatus.

SUMMARY

Provided are an electronic apparatus that effectively combines and provides responses and functions of chat-bots that are independently developed, and a control method thereof.

Further, provided are an electronic apparatus that can provide appropriate responses/functions while optimizing utilization of module components by repetitively using a question classification model that selects a chat-bot for responding to a question, and a control method thereof.

Further still, provided are an electronic apparatus that can effectively combine and provide responses/functions provided by chat-bots while maintaining the development environments of the respective chat-bots that are professionally/independently developed/updated for respective services, and a control method thereof.

Additional aspects will be set forth in part in the description that follows and, in part, will be apparent from the description, or may be learned by practice of the presented embodiments.

In accordance with an aspect of the disclosure, there is provided an electronic apparatus including a memory storing instructions, a plurality of chat-bots for responding to a plurality of questions, and a question classification model trained to identify one among the plurality of chat-bots for responding to an input question, and a processor configured to execute the instructions to input the input question into the question classification model, the question classification model outputting a first one among the plurality of chat-bots for responding to the input question. The processor is further configured to execute the instructions to acquire a first response for the input question, through the outputted first one among the plurality of chat-bots, based on the acquired first response including information of a function that can be performed at the electronic apparatus, generate a question requesting to perform the function, and input the generated question into the question classification model, the question classification model outputting a second one among the plurality of chat-bots for responding to the generated question. The processor is further configured to execute the instructions to acquire a second response for the generated question, through the outputted second one among the plurality of chat-bots, and provide a combined response to the input question, based on the acquired first response and the acquired second response.

The memory may further include information of a plurality of domains respectively mapped to the plurality of chat-bots, and the processor may be further configured to execute the instructions to, through the question classification model, identify a first one among the plurality of domains that is related to a text included in the input question, and based on the information of the plurality of domains respectively mapped to the plurality of chat-bots, select the first one among the plurality of chat-bots that is mapped to the identified first one among the plurality of domains.

The processor may be further configured to execute the instructions to, through the question classification model, identify a second one among the plurality of domains that is related to a text included in the generated question, and based on the information of the plurality of domains respectively mapped to the plurality of chat-bots, select the second one among the plurality of chat-bots that is mapped to the identified second one among the plurality of domains.

The processor may be further configured to execute the instructions to, based on the acquired first response not including the information of the function that can be performed at the electronic apparatus, provide a response to the input question, based on the acquired first response.

The memory may further include a list of functions that can be performed at the electronic apparatus, and the processor may be further configured to execute the instructions to, based on the acquired first response including information of a plurality of functions, identify at least one among the plurality of functions that can be performed at the electronic apparatus, based on the list, and generate the question requesting to perform the identified at least one among the plurality of functions.

The memory may further include a function selection model trained to, based on information of the plurality of functions being input, select one or more among the plurality of functions that corresponds to the input question, and the processor may be further configured to execute the instructions to input the information of the plurality of functions included in the acquired first response, the list, and the input question into the function selection model, the function selection model outputting the one or more among the plurality of functions that corresponds to the input question and can be performed at the electronic apparatus.

The processor may be further configured to execute the instructions to, based on identifying that there is not one among the plurality of chat-bots for responding to the generated question, provide a response to the input question, based on the acquired first response.

The processor may be further configured to execute the instructions to, based on the acquired first response and the acquired second response, generate the combined response including a question regarding whether the function can be performed, provide the generated combined response, and based on a request for performing the function being input as the combined response is provided, perform the function, through the second one among the plurality of chat-bots.

In accordance with an aspect of the disclosure, there is provided a control method of an electronic apparatus, the method including inputting an input question into a question classification model trained to identify one among a plurality of chat-bots for responding to the input question, the question classification model outputting a first one among the plurality of chat-bots for responding to the input question, acquiring a first response for the input question, through the outputted first one among the plurality of chat-bots, and based on the acquired first response including information of a function that can be performed at the electronic apparatus, generating a question requesting to perform the function. The control method further includes inputting the generated question into the question classification model, the question classification model outputting a second one among the plurality of chat-bots for responding to the generated question, acquiring a second response for the generated question, through the outputted second one among the plurality of chat-bots, and providing a combined response to the input question, based on the acquired first response and the acquired second response.

The inputting the input question into the question classification model may include, through the question classification model, identifying a first one among a plurality of domains that is related to a text included in the input question, the plurality of domains respectively mapped to the plurality of chat-bots, and based on the information of the plurality of domains respectively mapped to the plurality of chat-bots, selecting the first one among the plurality of chat-bots that is mapped to the identified first one among the plurality of domains.

The inputting the generated question into the question classification model may include, through the question classification model, identifying a second one among the plurality of domains that is related to a text included in the generated question, and based on the information of the plurality of domains respectively mapped to the plurality of chat-bots, selecting the second one among the plurality of chat-bots that is mapped to the identified second one among the plurality of domains.

The control method may further include, based on the acquired first response not including the information of the function that can be performed at the electronic apparatus, providing a response to the input question, based on the acquired first response.

The control method may further include, based on the acquired first response including information of a plurality of functions, identifying at least one among the plurality of functions that can be performed at the electronic apparatus, based on a list of functions that can be performed at the electronic apparatus, and generating the question requesting to perform the identified at least one among the plurality of functions.

The identifying the at least one among the plurality of functions that can be performed at the electronic apparatus may include inputting the information of the plurality of functions included in the acquired first response, the list, and the input question into a function selection model trained to, based on information of the plurality of functions being input, select one or more among the plurality of functions that corresponds to the input question, the function selection model outputting the one or more among the plurality of functions that corresponds to the input question and can be performed at the electronic apparatus.

The control method may further include, based on identifying that there is not one among the plurality of chat-bots for responding to the generated question, providing a response to the input question, based on the acquired first response.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
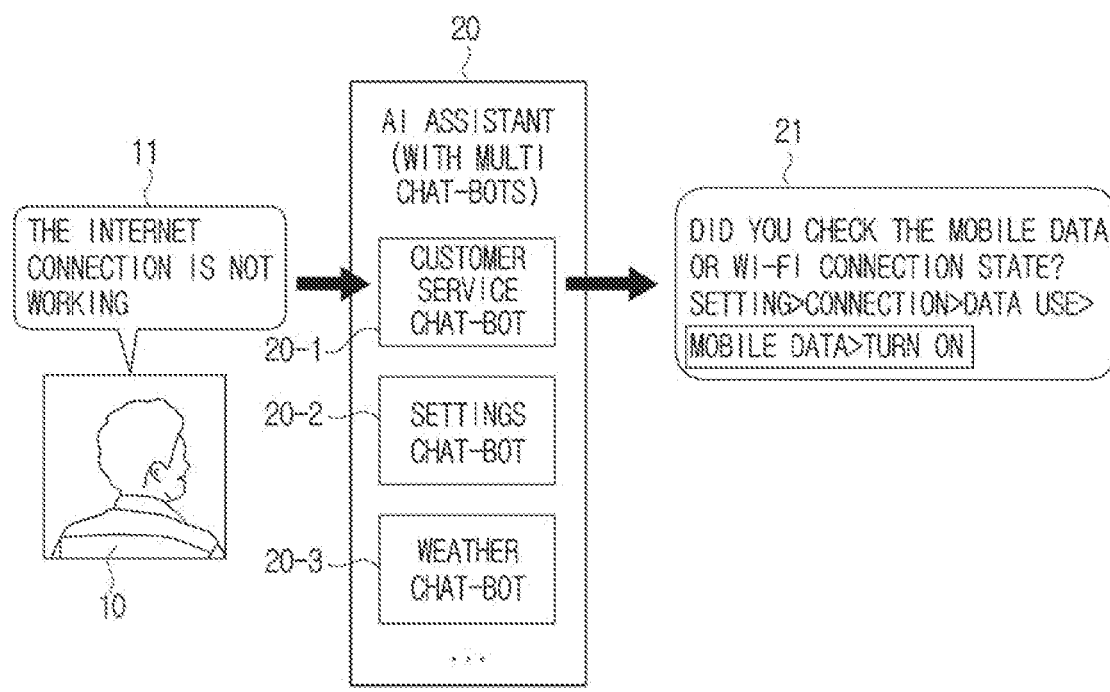
FIG. 1 is a diagram for illustrating an example of an operation of a multi chat-bot environment according to the related art.

An electronic apparatus and a control method according to the disclosure can effectively combine and provide responses and functions of chat-bots that are independently developed.

Also, the electronic apparatus and the control method according to the disclosure can provide responses/functions of a plurality of chat-bots while optimizing utilization of module components by repetitively using a question classification model that selects a chat-bot for responding to a question.

In addition, the electronic apparatus and the control method according to the disclosure can effectively combine and provide responses/functions provided by chat-bots while maintaining the development environments of the respective chat-bots that are professionally/independently developed/updated for respective services.

Before describing the disclosure in detail, the drafting format of this specification and the drawings will be described.

First, as terms used in this specification and the claims, general terms were selected in consideration of the functions in the various embodiments of the disclosure. However, the terms may vary depending on the intention of those skilled in the art, legal or technical interpretation, emergence of new technologies, etc. Also, there are terms that were designated by the applicant on his own, and in such cases, the meaning of the terms will be interpreted as defined in this specification, and if there is no definition of the terms, the meaning of the terms will be interpreted based on the overall content of this specification and common technical knowledge in the pertinent technical field.

Also, the same reference numerals or symbols described in each drawing accompanying this specification refer to components or elements substantially performing the same functions. For the convenience of explanation and understanding, the components or elements will be described by using the same reference numerals or symbols in different embodiments. That is, even if all components having the same reference numerals are illustrated in a plurality of drawings, the plurality of drawings do not mean one embodiment.

In addition, in this specification and the claims, terms including ordinal numbers such as "the first" and "the second" may be used for distinguishing components. Such ordinal numbers are used for distinguishing the same or similar components from one another, and it is not intended that the meaning of terms is restrictively interpreted due to use of such ordinal numbers. As an example, the order of use or the order of arrangement, etc. of a component combined with such ordinal numbers may not be restricted by the numbers. Depending on needs, each ordinal number may be used while being replaced with each other.

Further, in this specification, singular expressions include plural expressions, unless defined obviously differently in the context. Also, in the disclosure, terms such as "include" and "consist of" may be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

In addition, in the embodiments of the disclosure, terms such as "a module," "a unit," "a part" and the like are for referring to elements performing at least one function or operation, and these elements may be implemented as hardware or software, or as a combination of hardware and software. Further, a plurality of "modules," "units," "parts" and the like may be integrated into at least one module or chip and implemented as at least one processor, except when each of them needs to be implemented as individual hardware.

Also, in the embodiments of the disclosure, the description that a part is connected with another part not only includes a case of direct connection, but also a case of indirect connection through another medium. In addition, the description that a part includes an element means that another element may be further included, but not that another element is excluded, unless there is an opposing description.

Figure 2:
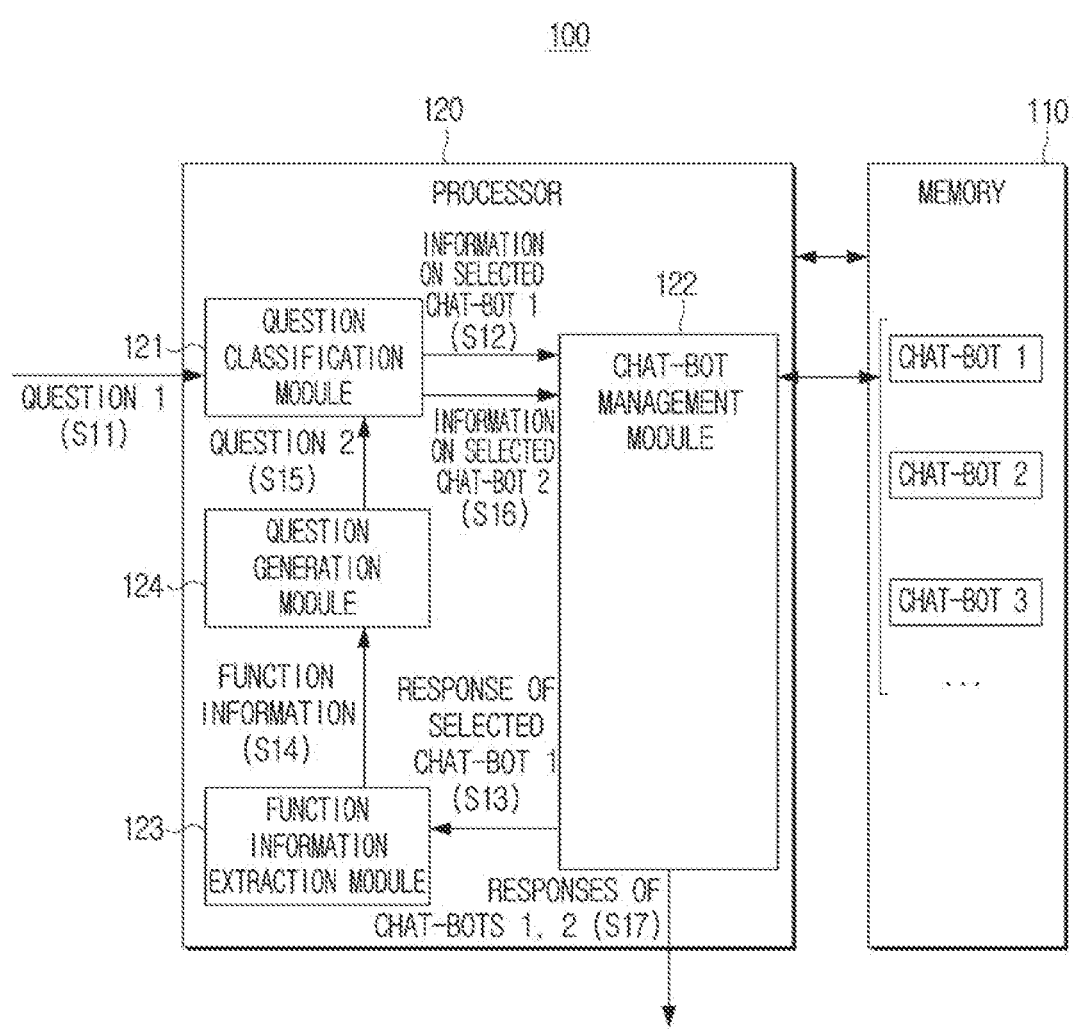
FIG. 2 is a block diagram of a configuration and an operation of an electronic apparatus according to an embodiment of the disclosure.

FIG. 2 is a block diagram of a configuration and an operation of an electronic apparatus according to an embodiment of the disclosure.

Referring to FIG. 2, an electronic apparatus 100 includes at least one memory 110 and a processor 120. The electronic apparatus 100 may be a server, a smartphone, an AI speaker, etc., but is not limited thereto.

The memory 110 may include a plurality of chat-bots.

A chat-bot means a chatting-robot, and it is a concept that includes an agent for providing at least one service through the electronic apparatus 100 based on communication with a user, or overall data constituting the agent.

The plurality of chat-bots included in the memory 110 may be divided in various ways according to the types of services provided by the electronic apparatus 100.

Here, a service may include a response provided with respect to a user's question, and depending on cases, a service may further include at least one function of the electronic apparatus 100 that is provided according to a user's question.

In the plurality of chat-bots, a customer service chat-bot that responds to overall questions of customers regarding the electronic apparatus 100 may be included.

If a user's question regarding the manipulation, the state, the defect, etc. of the electronic apparatus 100 is input, the customer service chat-bot may provide a response to the input question.

In the plurality of chat-bots, a setting chat-bot that manages a user setting for the electronic apparatus 100 may be included.

If a user's question for identifying the setting states for various user setting items of the electronic apparatus 100 (ex. data communication On/Off, Wi-Fi On/Off, power saving mode On/Off, access authority for information of an app, etc.) is input, the setting chat-bot may provide a response to the input question.

Also, the setting chat-bot may perform a function of changing the setting state of at least one setting item according to a user's request.

In the plurality of chat-bots, a weather chat-bot that provides a service of managing weather information may be included.

The weather chat-bot may provide a response to a user's question inquiring about the weather. Alternatively, the weather chat-bot may perform a function of providing the current weather to a user per predetermined period.

As described above, the plurality of chat-bots may include chat-bots that provide various services, and are not limited to the aforementioned examples.

Each chat-bot may respond to a user's question related to a service provided by the chat-bot. For this, a chat-bot may include a natural language processing module for understanding the meaning of a text input by a user, a question-response module for generating a separate text for responding to an input text, etc.

Here, the natural language processing module may use an artificial intelligence model trained to understand various keywords related to a service provided by a chat-bot.

Also, the question-response module may use an artificial intelligence model trained to, if a question is input, provide an appropriate response thereto through various questions-responses related to a service provided by a chat-bot.

Each chat-bot may include a function processing module for providing at least one function related to the service provided by the chat-bot.

For this, a function processing module of a chat-bot may include information on a function that can be performed at the electronic apparatus through the chat-bot.

As an example, a function processing module of a chat-bot may include at least one instruction that makes a function of the electronic apparatus 100 activated by being executed by the processor 120 of the electronic apparatus 100.

If a keyword related to a function provided by a chat-bot is extracted from a user's question/request that was input, the function processing module of the chat-bot may perform a function related to the extracted keyword.

As an example, if a user's request (ex. start the power saving mode) is input, the aforementioned setting chat-bot may extract keywords such as "the power saving mode," "start," etc. from the user's request.

Then, the setting chat-bot may be implemented to generate an instruction for activating the power saving mode of the electronic apparatus 100 by using the extracted keywords. As a result, the power saving mode of the electronic apparatus 100 may be activated.

The plurality of chat-bots included in the memory 110 may be included in one assistant. Here, the assistant may mean a comprehensive agent that provides various services through the electronic apparatus 100 based on communication with a user, such as Bixby.

That is, the plurality of services (responses, functions) provided through the plurality of chat-bots may be included in the comprehensive service provided by the assistant.

Although an embodiment wherein the plurality of chat-bots are included in the memory 110 of the electronic apparatus 100 was illustrated through FIG. 2, the electronic apparatus 100 may use a plurality of chat-bots stored in an external server. A detailed embodiment in this regard will be described later through FIG. 9A and FIG. 9B, etc.

The memory 110 may include a question classification model trained to determine a chat-bot for responding to an input question among a plurality of chat-bots. The question classification model may include at least one artificial intelligence model implemented in the form of a classifier.

As an example, the question classification model may be trained with a large number of questions as input data, and chat-bots for responding to the large number of respective questions as output data.

As an example, the question classification model may identify a domain mapped to an input question, and select a chat-bot mapped to the identified domain among the plurality of chat-bots.

A domain may be defined through texts corresponding to various words/sentences. A domain may include information on texts related to a service provided by at least one chat-bot.

Here, domains may be divided into various categories related to services provided by each chat-bot such as music, weather, news, sports, apparatus setting, customer service, etc., but the categories are not limited thereto.

As an example, a music domain may include information on various words and sentences related to a music service, and a sports domain may include information on various words and sentences related to a sports service.

The question classification model may be trained with a large number of texts as input data, and domains mapped to the large number of respective texts as output data.

Here, the question classification model may be trained to convert at least one text (word or sentence) included in an input question into a vector, and select a domain having the biggest relevance to the converted vector, but is not limited thereto.

In case a domain mapped to an input question is selected, the question classification model may determine a chat-bot mapped to the selected domain by using information on the plurality of domains mapped to the plurality of respective chat-bots stored in the memory 110.

As an example, in case a user's question inquiring about the game schedule of a professional soccer league is input into the question classification model, the question classification model may identify a domain mapped to the question as a sports domain.

In this case, a sports information chat-bot mapped with respect to the sports domain may be determined as a chat-bot for responding to the user's question.

Then, the processor 120 may provide a response to the user's question (: information on the game schedule) through the sports information chat-bot.

Referring to FIG. 2, the processor 120 may include a question classification module 121, a chat-bot management module 122, a function information extraction module 123, a question generation module 124, etc.

These modules may be implemented in the form of software or hardware. Alternatively, these modules may be implemented in a form of including software and hardware.

Hereinafter, detailed operations of these modules will be described with reference to FIG. 2.

The question classification module 121 is a module that selects a chat-bot to respond to an input question when a question is input.

The question classification module 121 may select a chat-bot to provide a response among the plurality of chat-bots stored in the memory 110 through the aforementioned question classification model.

As an example, referring to FIG. 2, a user's question (ex. The Internet connection is not working. What should I do?) may be input into the processor 120 in operation S11.

A case wherein the electronic apparatus 100 is implemented as a server is assumed. In this case, a user's question may be input into a smartphone or an AI speaker in the form of a voice. Here, the smartphone or the AI speaker may convert the input user voice into a text, and transmit it to the electronic apparatus 100. In this case, the processor 120 may receive the converted text through a communication interface of the electronic apparatus 100.

Alternatively, a case wherein the electronic apparatus 100 is implemented as a smartphone or an AI speaker is assumed. In this case, if a user uttered a question, the user voice is input through a microphone of the electronic apparatus 100, and the processor 120 may acquire a text converted from the input user voice.

Here, the question classification module 121 may input the input user's question into the aforementioned question classification model, and select a chat-bot 1 (ex. a customer service chat-bot) for responding to the user's question (question 1) among the plurality of chat-bots.

As an example, the question classification module 121 may identify a first domain (ex. a customer service domain) related to a text included in the input user's question (question 1) among the plurality of domains through the question classification model.

Then, the question classification module 121 may select the chat-bot 1 (ex. the customer service chat-bot) mapped to the identified first domain among the plurality of chat-bots based on information on the plurality of domains respectively mapped to the plurality of chat-bots.

Then, the question classification module 121 may transmit information on the selected chat-bot 1 to the chat-bot management module 122 in operation S12.

The chat-bot management module 122 is a module for managing a plurality of chat-bots stored in the memory 110.

The chat-bot management module 122 may input a question into at least one chat-bot, and acquire a response output from the chat-bot into which the question was input.

Here, the chat-bot management module 122 may provide the acquired response to the user.

Also, the chat-bot management module 122 may perform at least one function of the electronic apparatus 100 through at least one chat-bot.

Referring to FIG. 2, the chat-bot management module 122 may input a user's question into the chat-bot 1 selected by the question classification module 121.

In this case, a first response (ex. Did you check the mobile data or Wi-Fi connection state? Setting>connection>data use>mobile data>turn on) of the selected chat-bot 1 regarding the user's question may be acquired in operation S13.

The function information extraction module 123 is a module for extracting information on a function from a response output from at least one chat-bot.

The function information extraction module 123 may extract information on functions that can be performed by the electronic apparatus 100.

The function information extraction module 123 may include a keyword extraction module for extracting keywords related to a function from a response (text), and determine whether the extracted each keyword is a function that can be performed at the electronic apparatus 100.

For this, the function information extraction module 123 may use a list for functions that can be performed by the electronic apparatus 100. This list may have been stored in the memory 110 in advance.

The function information extraction module 123 may compare the extracted each keyword with the functions in the aforementioned list.

As an example, referring to FIG. 2, the function information extraction module 123 may receive the first response of the chat-bot 1 from the chat-bot management module 122 in operation S13.

Then, the function information extraction module 123 may extract information on at least one function (ex. mobile data>turn on) that can be performed at the electronic apparatus 100 from the first response of the chat-bot 1 in operation S14.

Here, in case information on a plurality of functions was extracted from the first response, the function information extraction module 123 may select at least one function among the plurality of functions. A detailed embodiment in this regard will be described later through FIG. 5A and FIG. 5B.

As described above, in case information on a function (ex. mobile data>turn on) that can be performed at the electronic apparatus 100 is extracted/selected by the function information extraction module 123, the function information extraction module 123 may transmit the extracted/selected information on the function to the question generation module 124 in operation S14.

In case the first response does not include information on a function that can be performed at the electronic apparatus 100, the processor 120 may provide a response to a user's question based on the aforementioned first response. That is, the processor 120 may provide only the aforementioned first response.

As an example, in case the electronic apparatus 100 is a server, the processor 120 may transmit information on the first response to a smartphone or an AI speaker through the communication interface. In this case, the first response may be output in the form of a voice through the smartphone or the AI speaker.

As another example, in case the electronic apparatus 100 is a smartphone or an AI speaker, the first response may be output in the form of a voice through the speaker of the electronic apparatus 100.

The question generation module 124 is a module for generating a question (Text) related to at least one function.

The question generation module 124 may generate a question by using information on a function acquired through the function information extraction module 123.

Here, the question generation module 124 may generate a question requesting to perform the function.

For this, the question generation module 124 may use a question generation model including at least one artificial intelligence model that is trained to, if information on at least one function is input, generate a question (text) requesting to perform the input function.

As an example, referring to FIG. 2, the question generation module 124 may generate a question (ex. Turn on the mobile data) requesting to perform the function (ex. mobile data>turn on) extracted from the function information extraction module 123, and transmit the generated question to the question classification module 121 in operation S15.

In this case, the question classification module 121 may select a chat-bot 2 (ex. a setting chat-bot) for responding to the generated question. That is, the processor 120 may select the chat-bot 2 that can perform the function included in the first response by using the question classification module 121.

As an example, the question classification module 121 may identify a second domain (ex. an apparatus setting domain) related to a text included in a generated question (question 2) among the plurality of domains through the question classification model.

Then, the question classification module 121 may select the chat-bot 2 (ex. the setting chat-bot) mapped to the identified second domain among the plurality of chat-bots based on information on the plurality of domains respectively mapped to the plurality of chat-bots.

Then, the question classification module 121 may transmit information on the selected chat-bot 2 to the chat-bot management module 122 in operation S16.

Here, the chat-bot management module 122 may immediately perform the function (ex. turning on the mobile data) of the electronic apparatus 100 requested by the generated question (ex. Turn on the mobile data) by using the chat-bot 2.

Alternatively, the chat-bot management module 122 may acquire a second response (ex. Shall I turn on the mobile data?) of the chat-bot 2 regarding the generated question (ex. Turn on the mobile data), and provide a response to the user's question (question 1) based on the aforementioned first response and second response in operation S17.

The processor 120 may generate a combined response for the input user's question (question 1) based on the first response and the second response.

Here, the combined response may simply include the first response and the second response, or it may be a new response wherein the first response and the second response are fused.

As an example, the processor 120 may generate a combined response (ex. The mobile data should be turned on. Shall I turn on the mobile data?) including a question regarding whether to perform the function (ex. turning on the mobile data) extracted from the aforementioned first response, based on the first response and the second response.

For this, the processor 120 may use at least one response generator model, and a detailed embodiment related thereto will be described later through FIG. 7.

Then, the chat-bot management module 122 may provide the generated combined response.

As a combined response is provided, a user's request (question or instruction) for performing an extracted function may be input.

For example, as a combined response such as "The mobile data should be turned on. Shall I turn on the mobile data?" is provided, a user's response such as "Yes" may be received.

In this case, the chat-bot 2 (ex. the setting chat-bot) may perform the aforementioned function (ex. turning on the mobile data) according to the user's response.

As described above, in case a response provided through a chat-bot includes information on a separate function, the electronic apparatus 100 according to the disclosure may not immediately provide the response, but additionally acquire a response of another chat-bot that can perform the function.

As a result, responses acquired from a plurality of chat-bots may be provided together, and thus there is an effect that a more effective response regarding a user's question can be provided with a corresponding function.

Hereinafter, with reference to FIG. 3 to FIG. 7, operations of each of the aforementioned modules will be described through more examples.

Figure 3:
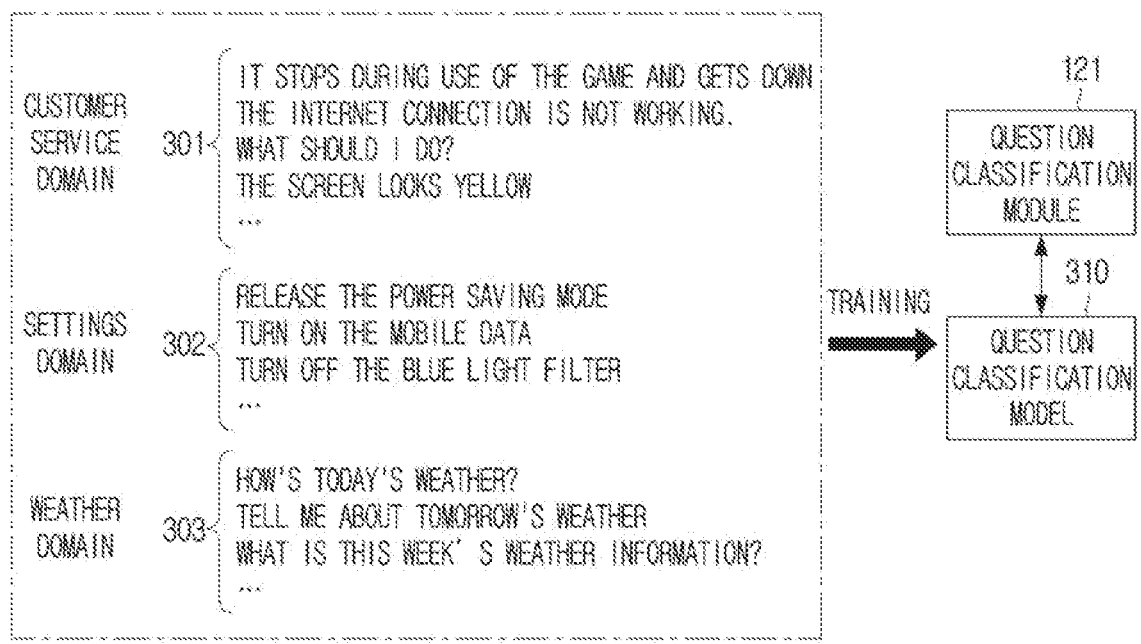
FIG. 3 is a diagram for illustrating a process wherein a question classification model according to an embodiment of the disclosure is trained.

FIG. 3 is a block diagram for illustrating a process wherein a question classification model according to an embodiment of the disclosure is trained.

Referring to FIG. 3, the question classification module 121 may use a question classification model 310 trained to determine a domain matched to an input question.

The question classification model 310 may be trained through question texts for training matched to each of various domains.

As an example, referring to FIG. 3, the question classification model 310 may be trained through questions 301 related to the customer service domain, questions 302 related to the setting domain, and questions 303 related to the weather domain.

As a result, the question classification module 121 may input a user's question into the question classification model 310, and acquire a domain related to the user's question.

Then, the question classification module 121 may select a chat-bot matched to the acquired domain as a chat-bot for providing a response to the user's question.

For example, if a user's question that is "The Internet connection is not working" is received, the question classification module 121 may input the user's question into the question classification model 310, and thereby determine a domain (: a customer service domain) matched to the user's question.

Then, the question classification module 121 may select a customer service chat-bot matched to the customer service domain as a chat-bot for providing a response to the user's question.

Figure 4:
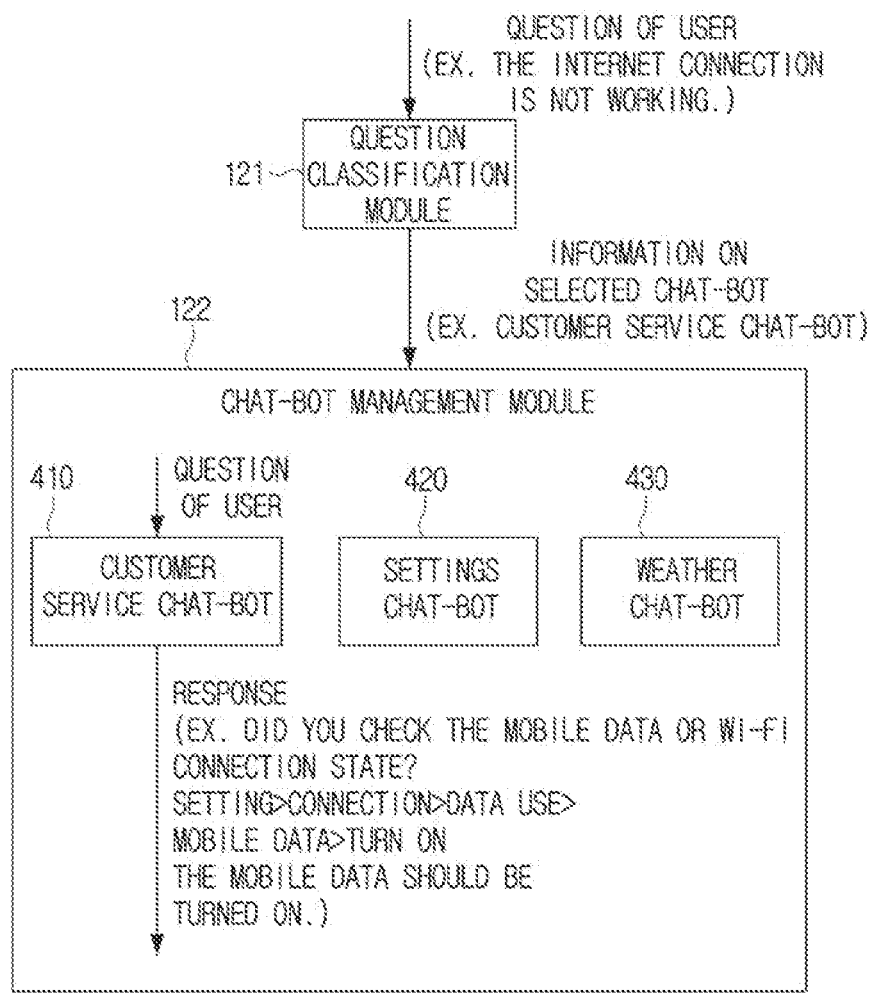
FIG. 4 is a block diagram for illustrating an operation of an electronic apparatus according to an embodiment of the disclosure of acquiring a response of a selected chat-bot.

FIG. 4 is a block diagram for illustrating an operation of an electronic apparatus according to an embodiment of the disclosure of acquiring a response of a selected chat-bot.

Referring to FIG. 4, the chat-bot management module 122 may acquire information on a chat-bot (ex. a customer service chat-bot) selected by the question classification module 121.

Here, the chat-bot management module 122 may input a user's question into the selected chat-bot (the customer service chat-bot) among the plurality of chat-bots 410, 420, 430, etc.

As a result, a response of the customer service chat-bot for the user's question may be acquired as in FIG. 4.

Figure 5A:
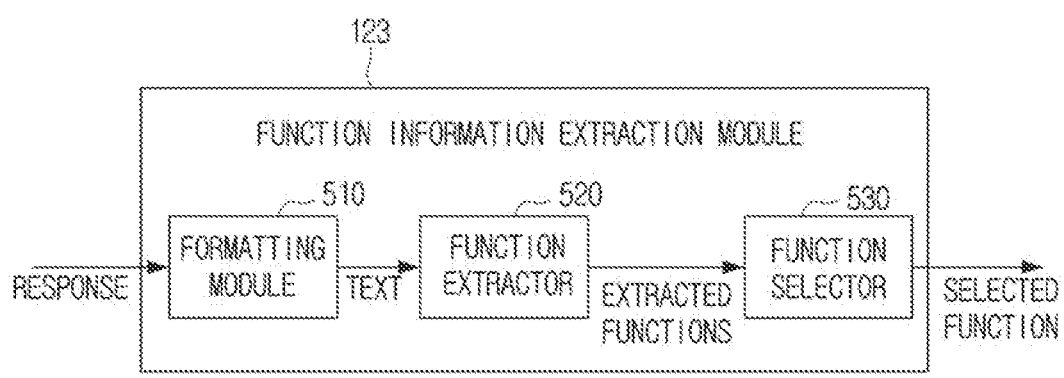
FIG. 5A is a block diagram of a function information extraction module of an electronic apparatus according to an embodiment of the disclosure of extracting/selecting function information from a chat-bot's response.

FIG. 5A is a block diagram of a function information extraction module of an electronic apparatus according to an embodiment of the disclosure of extracting/selecting function information from a chat-bot's response.

Referring to FIG. 5A, the aforementioned function information extraction module 123 may include a formatting module 510, a function extractor 520, a function selector 530, etc.

The formatting module 510 is a module for converting a chat-bot's response for a user's question into the form of a text.

In case a chat-bot's response is a text, an operation of the formatting module 510 is not necessary, but in case a chat-bot's response is an image or a video, the formatting module 510 may acquire a text from the image or the video.

For this, the formatting module 510 may recognize at least one text included in an image/a video through technologies such as optical character recognition (OCR), etc., but the disclosure is not limited thereto.

The function extractor 520 is a module for extracting information on at least one function from a text.

The function extractor 520 may acquire words/sentences matched to at least one function from a text by using prestored words/sentences that indicate each of various functions.

For this, the function extractor 520 may vectorize each word/sentence included in a text and compare them with the vectors of the prestored words/sentences, but the disclosure is not limited thereto.

The function selector 530 is a module for selecting a function that can be performed at the electronic apparatus 100.

The function selector 530 may select a function that can be performed at the electronic apparatus 100 among at least one function extracted from the function extractor 520.

As an example, a list regarding functions that can be performed at the electronic apparatus 100 may be stored in the memory 110.

Here, in case a plurality of functions were extracted through the function extractor 520, the function selector 530 may identify at least one function that can be performed at the electronic apparatus 100 among the plurality of functions based on the list.

The function selector 530 may use a function selection model trained to select a function for responding to a question among a plurality of functions.

Figure 5B:
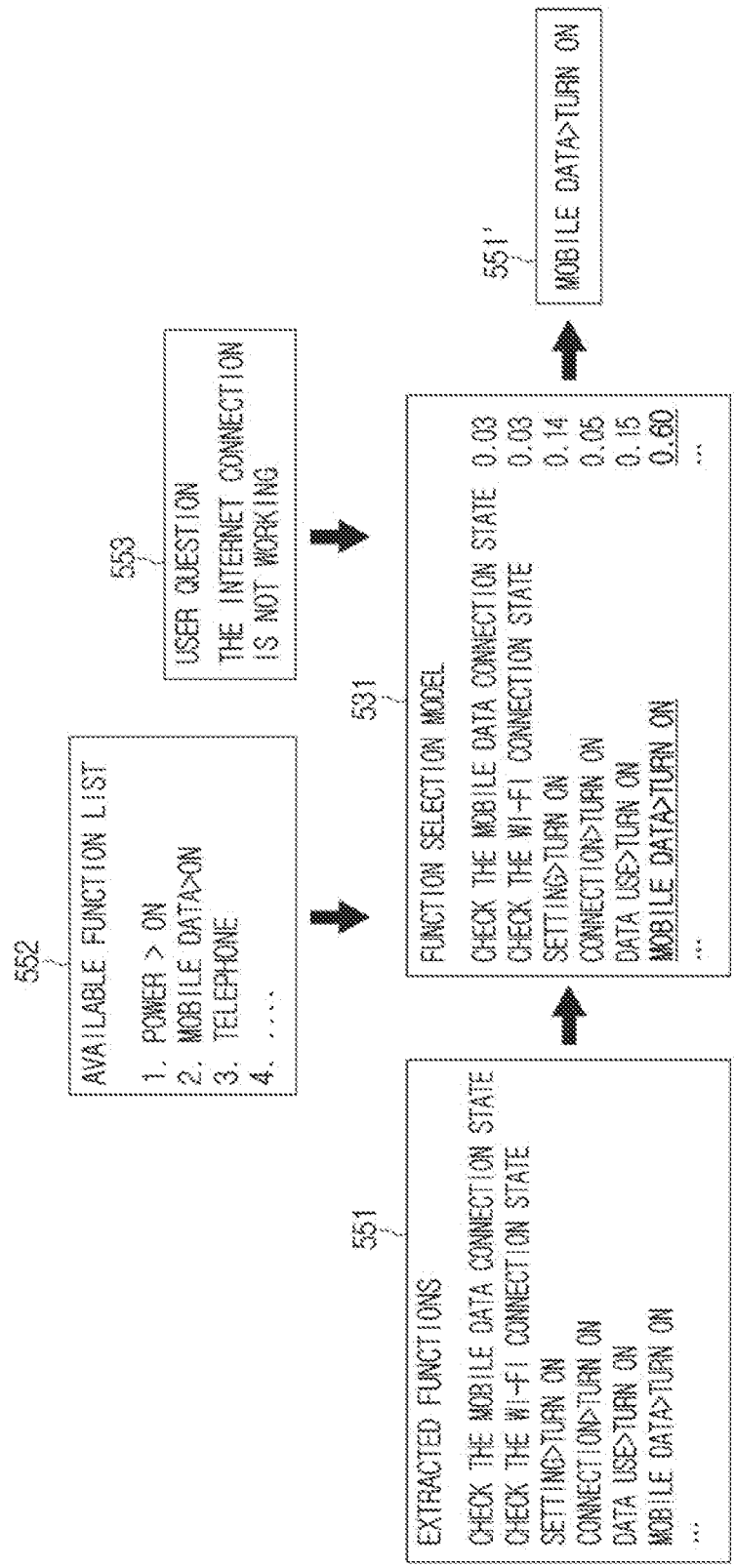
FIG. 5B is a diagram for illustrating an operation of an electronic apparatus according to an embodiment of the disclosure of selecting at least one function from a plurality of extracted functions.

FIG. 5B is a diagram for illustrating an operation of an electronic apparatus according to an embodiment of the disclosure of selecting at least one function from a plurality of extracted functions.

FIG. 5B is based on the assumption of a situation wherein a plurality of functions 551 were extracted through the function extractor 520.

In this case, the function selector 530 may input the plurality of extracted functions 551 into a function selection model 531.

In addition, the function selector 530 may input a list 552 regarding functions that can be performed at the electronic apparatus 100 and a user's question 553 into the function selection model 531.

Then, referring to FIG. 5B, the function selection model 531 may calculate scores for each of the extracted functions 551 by using the list 552 and the user's question 553.

The scores may be defined as complexly digitizing relevance to a user's question and operability at the electronic apparatus 100, for each function.

For this, the function selection model 531 may be trained to identify a function related to a response text that may follow a user's question based on a conversation generation technology. (ex. RNN). Also, the function selection model 531 may be trained to vectorize each function that can be performed at the electronic apparatus 100 and each of the input (extracted) function, and calculate similarity.

Also, referring to FIG. 5B, the function selection model 531 may output mobile data>turn on 551' that is the function having the highest calculated score among the extracted functions 551.

In case a function that can be performed at the electronic apparatus 100 is not extracted from a chat-bot's response, the processor 120 may immediately provide the response.

For example, in case no function was extracted from a response, or a function that can be performed at the electronic apparatus 100 was not extracted from a response, the processor 120 may output only the response in the form of a voice through the speaker.

Figure 6:
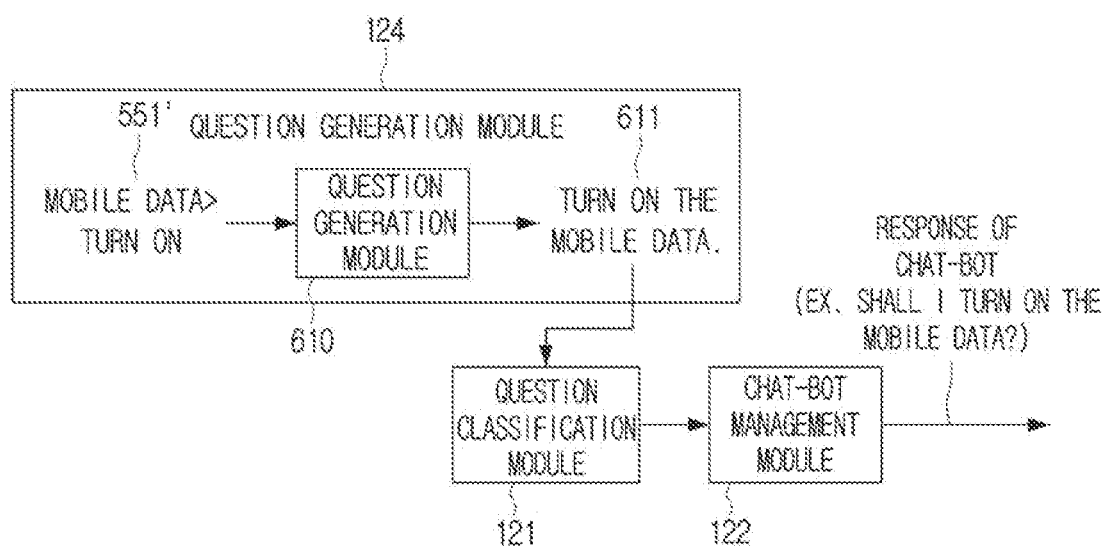
FIG. 6 is a block diagram of a question generation module of an electronic apparatus according to an embodiment of the disclosure of generating a question requesting to perform an extracted/selected function and using the question.

FIG. 6 is a block diagram of a question generation module of an electronic apparatus according to an embodiment of the disclosure of generating a question requesting to perform an extracted/selected function and using the question.

The question generation module 124 may generate a question related to a function extracted/selected from the function information extraction module 123.

Referring to FIG. 6, the question generation module 124 may generate a question 611 requesting a function 551' extracted/selected from the function information extraction module 123.

For this, the question generation module 124 may use a question generation model 610 trained to convert an input word/sentence into a question text.

The question generation model 610 may be implemented in a form of including an encoder and a decoder for changing the type of an input word/sentence to a question sentence, but the disclosure is not limited thereto.

Also, referring to FIG. 6, the generated question 611 may then be input into the question classification module 121.

Here, the question classification module 121 may select a chat-bot for responding to the generated question 611 and/or providing a function related to the generated question 611.

As a result, a chat-bot that can perform the function 551' may be selected.

Then, the chat-bot management module 122 may input the generated question 611 into the selected chat-bot (ex. a setting chat-bot) and acquire a response (Shall I turn on the mobile data?).

As described above, a response acquired according to a generated question may include a question text inquiring about whether to perform a function (mobile data>turn on) extracted/selected from the function information extraction module 123.

In case it was identified that there is no chat-bot for responding to a generated question among the plurality of chat-bots, a response for a user's question may be provided only based on the aforementioned response acquired in FIG. 4.

For example, in case the question classification module 121 input the generated question 511' into the question classification model 310, and as a result, the customer service chat-bot that was already selected for responding to a user's question (refer to FIG. 4) is selected again, the processor 120 may provide only the previous response of the customer service chat-bot (refer to FIG. 4).

As another example, in case the question classification module 121 input the generated question 511' into the question classification model 310, and as a result, no chat-bot is selected, the processor 120 may provide only the previous response of the customer service chat-bot (refer to FIG. 4).

In case responses were acquired from each of the chat-bot selected according to a user's question and the chat-bot selected according to a generated question, the processor 120 may provide a response to the user's question by using the acquired responses.

Here, the processor 120 may simply provide the acquired responses together, or the processor 120 may generate a combined response wherein the responses are combined and provide the generated combined response.

Figure 7:
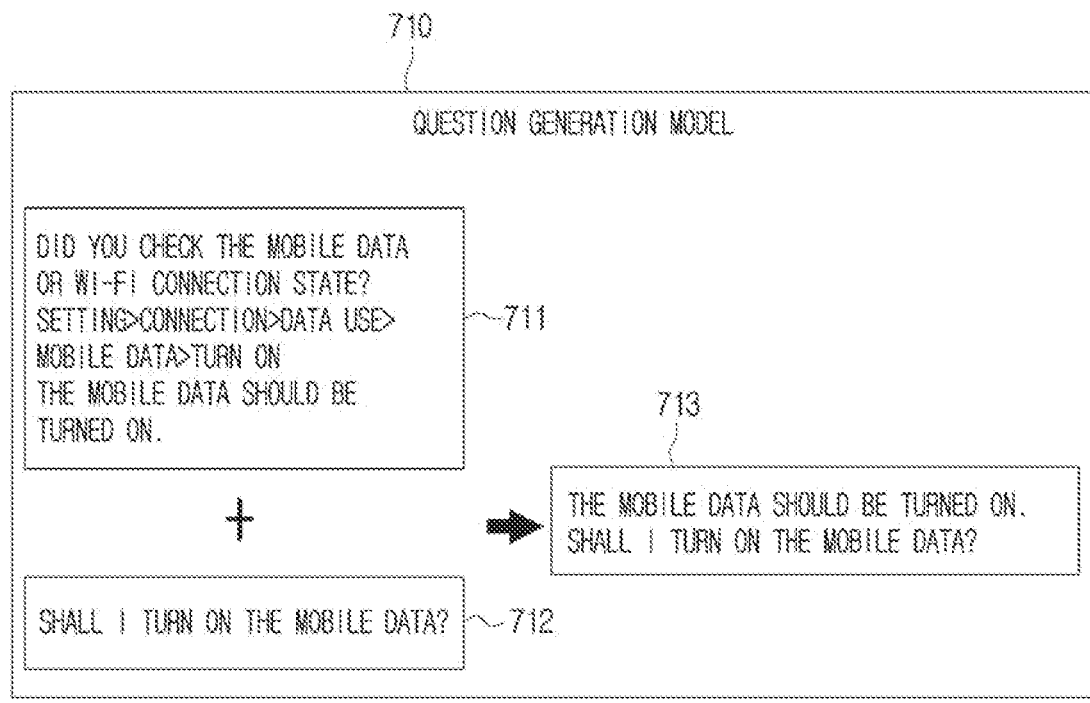
FIG. 7 is a diagram for illustrating an operation of an electronic apparatus according to an embodiment of the disclosure of combining responses output from different chat-bots.

FIG. 7 is a diagram for illustrating an operation of an electronic apparatus according to an embodiment of the disclosure of combining responses output from different chat-bots.

Referring to FIG. 7, the processor 120 may use a response generation model 710 trained to, if a plurality of responses are input, combine the inputs.

The response generation model 710 may be implemented by using models trained to perform summary for a text. In this case, if a plurality of responses are input, the response generation model 710 may summarize the entire text including the input responses and output a combined response.

Alternatively, the response generation model 710 may be trained with the two responses and the combined response wherein the responses are combined respectively as input/output training data.

Referring to FIG. 7, the processor 120 may input a response 711 in FIG. 4 and a response 712 in FIG. 6 into the response generation model 710, and as a result, acquire a combined response 713. The combined response 713 includes a question regarding whether to perform the mobile data>turn on 551' function.

Here, in case a user's request for performing the function is input, the processor 120 may perform the function (mobile data>turn on) through the chat-bot (ex. the setting chat-bot) that provided the response 712.

Figure 8:
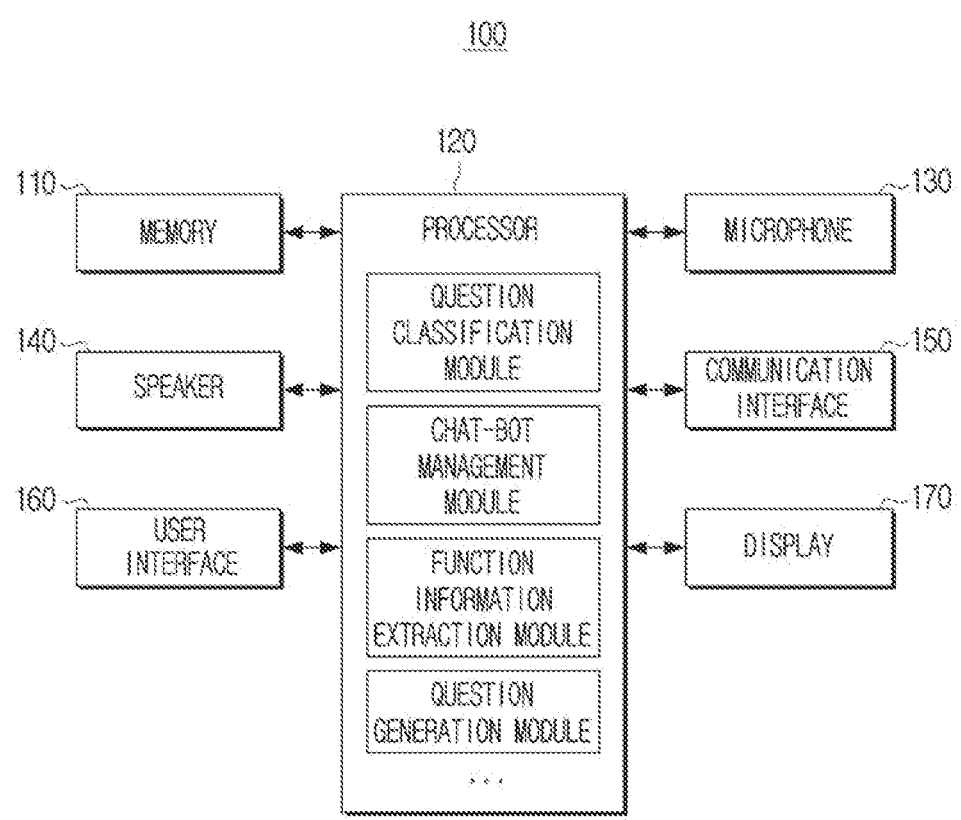
FIG. 8 is a block diagram of a detailed configuration of an electronic apparatus according to various embodiments of the disclosure.

FIG. 8 is a block diagram of a detailed configuration of an electronic apparatus according to various embodiments of the disclosure.

Referring to FIG. 8, the electronic apparatus 100 may further include a microphone 130, a speaker 140, a communication interface 150, a user interface 160, a display 170, etc. other than the memory 110 and the processor 120.

The memory 110 is a component for storing an operating system (OS) for controlling the overall operations of the components of the electronic apparatus 100 and at least one instruction or data related to the components of the electronic apparatus 100.

The memory 110 may include one or more of a non-volatile memory such as a ROM, a flash memory, etc., and it may also include a volatile memory consisting of a DRAM, etc. Also, the memory 110 may include a hard disk, a solid state drive (SSD), etc.

In the memory 110, artificial intelligence models such as a question classification model 310, a function selection model 531, a question generation model 610, a response generation model 710, etc. may be stored.

Each artificial intelligence model may consist of, for example, a plurality of neural network layers. Each of the plurality of neural network layers has a plurality of weight values, and performs a neural network operation through an operation between the operation result of the previous layer and the plurality of weight values. The plurality of weight values included by the plurality of neural network layers may be optimized by the learning result of the artificial intelligence model.

Other than the above, the memory 110 may include an auto speech recognition (ASR) model, a natural language understanding model, a text-to-speech (TTS) model, etc., and in addition to them, the memory 110 may include artificial intelligence models having various functions constituting each chat-bot.

The processor 120 controls the overall operations of the electronic apparatus 100. The processor 120 may be connected with the memory 110 and control the electronic apparatus 100.

For this, the processor 120 may include a central processing unit (CPU), a graphic processing unit (GPU), a neural processing unit (NPU), etc. in terms of hardware, and the processor 120 may perform operations or data processing related to control of the other components included in the electronic apparatus 100.

The processor 120 may be implemented as a micro processing unit (MPU), or it may correspond to a computer wherein a random access memory (RAM) and a read only memory (ROM), etc. are connected with a CPU, etc. through a system bus.

The processor 120 may control not only hardware components included in the electronic apparatus 100 but also one or more software modules included in the electronic apparatus 100. Also, a result of the processor 120 of controlling software modules may be derived as operations of the hardware components.

The processor 120 may consist of one or a plurality of processors. Here, the one or plurality of processors may be generic-purpose processors such as a CPU, an AP, etc., graphic-dedicated processors such as a GPU, a VPU, etc., or artificial intelligence-dedicated processors such as an NPU.

The one or plurality of processors perform control such that input data is processed according to a pre-defined operation rule or an artificial intelligence model stored in the memory. The pre-defined operation rule or the artificial intelligence model are characterized in that they are made through learning (training).

Here, being made through learning means that a learning algorithm is applied to a plurality of learning data, and a pre-defined operation rule or an artificial intelligence model having a desired characteristic is thereby made. Such learning may be performed in an apparatus itself wherein artificial intelligence according to the disclosure is performed, or performed through a separate server/system.

A learning algorithm is a method of training a subject apparatus (e.g., a robot) by using a plurality of learning data and thereby making the subject apparatus make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

The microphone 130 is a component for receiving a user's voice. The microphone 130 includes at least one circuit for converting a user's voice into an electronic audio signal.

The speaker 140 is a component for outputting a response/a question of at least one chat-bot or assistant in the form of a voice. The speaker 140 may include various components for converting an electronic audio signal into a sound.

The communication interface 150 is a component for performing communication with one or more external electronic apparatuses, and it may include a circuit.

The communication interface 150 may transmit and receive various information with one or more external electronic apparatuses by using communication protocols such as a Transmission Control Protocol/an Internet Protocol (TCP/IP), a User Datagram Protocol (UDP), a Hyper Text Transfer Protocol (HTTP), a Secure Hyper Text Transfer Protocol (HTTPS), a File Transfer Protocol (FTP), a Secure File Transfer Protocol (SFTP), a Message Queuing Telemetry Transport (MQTT), etc.

For this, the communication interface 150 may be connected with an external electronic apparatus based on a network implemented through wired communication and/or wireless communication. Here, the communication interface 150 may be directly connected with an external electronic apparatus, but it may also be connected with an external electronic apparatus through one or more external servers (ex. an Internet Service Provider (ISP)) that provide a network.

A network may be a personal area network (PAN), a local area network (LAN), a wide area network (WAN), etc. according to the area or the scale, and it may be an Intranet, an Extranet, or the Internet, etc. according to the openness of the network.

Wireless communication may include any one or any combination of communication methods such as long-term evolution (LTE), LTE Advance (LTE-A), 5th Generation (5G) mobile communication, code division multiple access (CDMA), wideband CDMA (WCDMA), a universal mobile telecommunications system (UMTS), a wireless broadband (WiBro), a global system for mobile communications (GSM), time division multiple access (DMA), WiFi (Wi-Fi), WiFi Direct, Bluetooth, near field communication (NFC), Zigbee, etc.

Wired communication may include any one or any combination of communication methods such as an Ethernet, an optical network, a universal serial bus (USB), a Thunderbolt, etc. Here, the communication interface 150 may include a network interface or a network chip according to the aforementioned wired and wireless communication methods. Communication methods are not limited to the aforementioned examples, but they may include communication methods that newly appear according to the development of technologies.

As an example, the communication interface 150 may perform communication with at least one external server.

In case a plurality of chat-bots are stored in a server, the processor 120 may receive the responses of each chat-bot through the communication interface 150. An embodiment related thereto will be described later through FIG. 9A.

Alternatively, any one or any combination of the aforementioned modules 121, 122, 123, 124 may be stored in a server. In this case, a system including the electronic apparatus 100 and the server 200 connected with the electronic apparatus 100 through the communication interface 150 may perform the operations of the aforementioned modules.

The user interface 160 is a component for receiving a user instruction and/or user information in various forms. The user interface 160 may include various input interfaces such as a camera, a touch sensor, a button, etc.

The display 170 is a component for displaying various contents or various user interfaces provided through the electronic apparatus 100.

The display 170 may visually provide services or responses provided through at least one chat-bot.

The display 170 may be implemented as an LED, a liquid crystal display (LCD), a plasma display panel (PDP), organic light emitting diodes (OLED), transparent OLED (TOLED), a micro LED, etc., but is not limited thereto.

The display 170 may be implemented in the form of a touch screen that can detect a user's touch operation, and it may also be implemented as a flexible display that can be folded or bent.

Figure 9A:
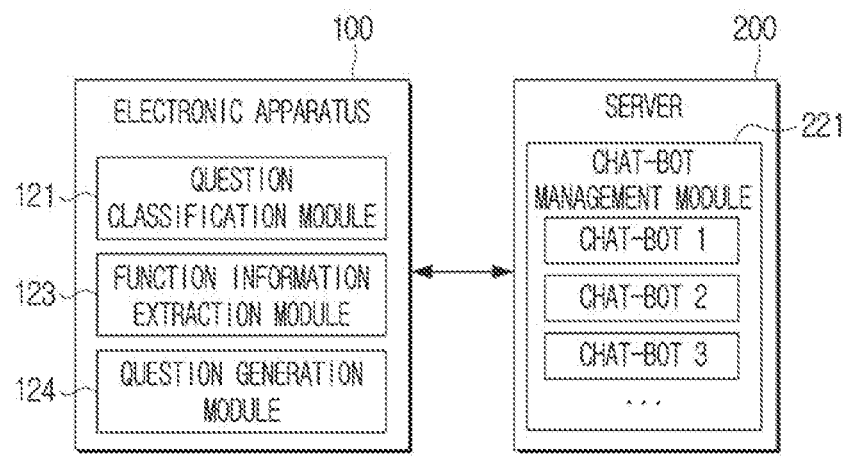
FIG. 9A is a block diagram for illustrating an operation of an electronic apparatus of using a plurality of chat-bots stored in a server according to an embodiment of the disclosure.

FIG. 9A is a block diagram for illustrating an operation of an electronic apparatus of using a plurality of chat-bots stored in a server according to an embodiment of the disclosure.

FIG. 9A assumes a case wherein a plurality of chat-bots are stored in a server 200. In FIG. 9A, the server 200 may input a question into each chat-bot through a chat-bot management module 221, and acquire a response through each chat-bot.

As an example, in case the question classification module 121 selected the chat-bot 1 as a user's question was input into the electronic apparatus 100, the electronic apparatus 100 may transmit information on the selected chat-bot 1 and the user's question to the server 200.

In this case, the server 200 may acquire a response for the user's question through the chat-bot 1, and transmit the response to the electronic apparatus 100.

Here, the electronic apparatus 100 may generate a question (the question generation module 124) by using the response received from the server 200, and extract/select a function (the function information extraction module 123) from the generated question.

Then, the electronic apparatus 100 may select a chat-bot 2 that will provide a response to the generated question through the question classification module 121.

Here, the electronic apparatus 100 may transmit information on the selected chat-bot 2 and the generated question to the server 200.

Then, when a response of the chat-bot 2 for the generated question is received from the server 200, the electronic apparatus 100 may combine the responses of the chat-bot 1 and the chat-bot 2 and provide the response.

Figure 9B:
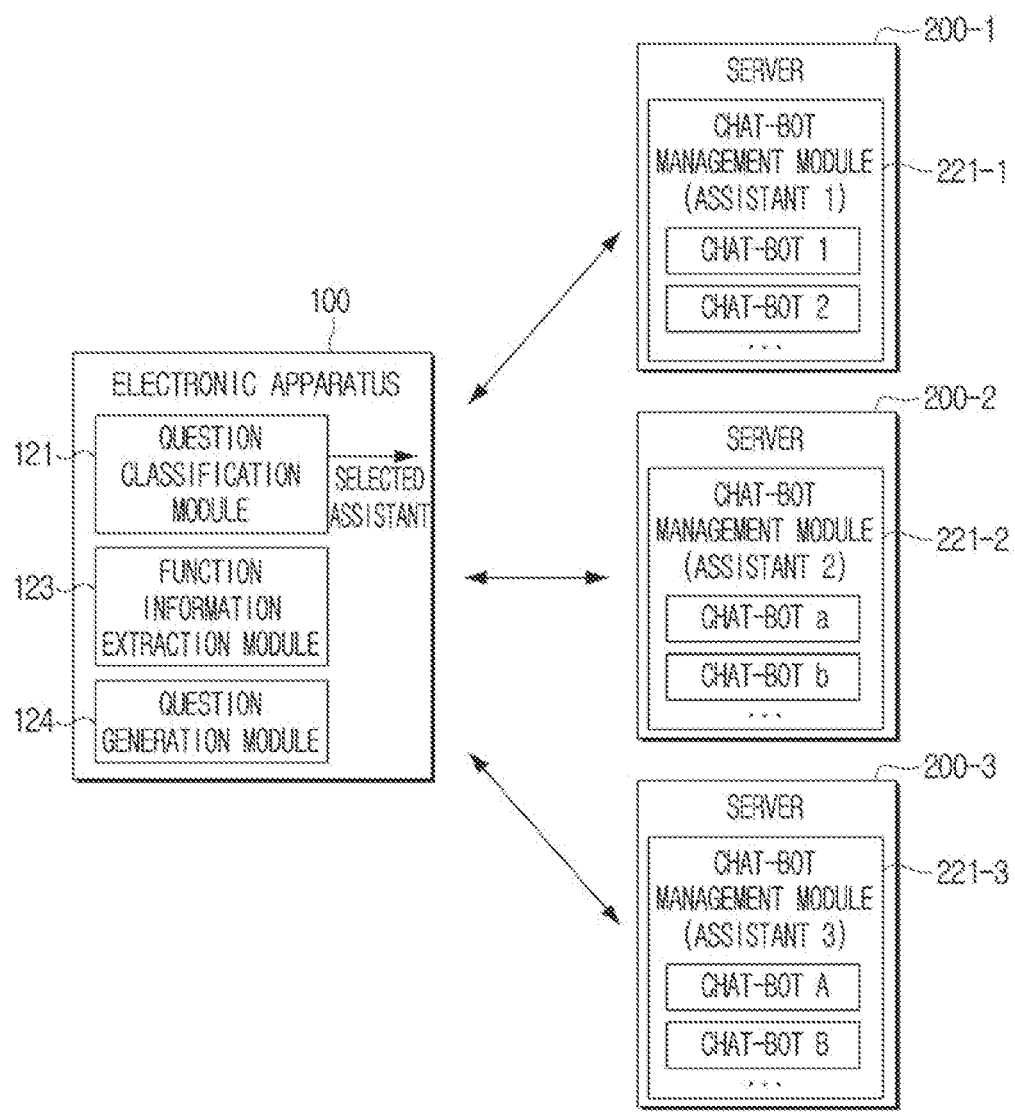
FIG. 9B is a block diagram for illustrating an operation of an electronic apparatus of selectively using assistants stored in each server according to an embodiment of the disclosure.

FIG. 9B is a block diagram for illustrating an operation of an electronic apparatus of selectively using assistants stored in each server according to an embodiment of the disclosure.

FIG. 9B assumes a case wherein the electronic apparatus 100 performs communication with a plurality of servers 200-1, 2, 3 providing services based on different assistants.

Here, each of the assistants stored in the servers 200-1, 2, 3 may respectively include multi chat-bots.

The server 200-1 may manage the services (responses, functions, etc.) of the Assistant 1 through a chat-bot management module 221-1, the server 200-2 may manage the services of the Assistant 2 through a chat-bot management module 221-2, and the server 200-3 may manage the services of the Assistant 3 through a chat-bot management module 221-3.

In the case of FIG. 9B, the question classification module 121 may use a classification model trained to determine at least one assistant for responding to an input question.

As an example, as a user's question is input into the electronic apparatus 100, the question classification module 121 may select the Assistant 1 as an assistant for responding to the user's question.

In this case, the electronic apparatus 100 may transmit information on the selected Assistant 1 and the user's question to the server 200-1.

In this case, the server 200-1 may acquire a response for the user's question through the Assistant 1, and transmit the response to the electronic apparatus 100.

Here, the electronic apparatus 100 may generate a question (the question generation module 124) by using the response received from the server 200, and extract/select a function from the generated question (the function information extraction module 123).

Then, the electronic apparatus 100 may select the Assistant 2 to provide a response to the generated question through the question classification module 121.

Here, the electronic apparatus 100 may transmit information on the selected Assistant 2 and the generated question to the server 200.

Then, when the response of the Assistant 2 for the generated question is received from the server 200, the electronic apparatus 100 may combine the responses of the Assistant 1 and the Assistant 2, and provide the combined response.

As described above, the electronic apparatus 100 according to the disclosure may be constituted to not only combine responses/functions of a plurality of chat-bots and provide them, but also combine responses/functions of a plurality of assistants and provide them.

A control method of an electronic apparatus according to the disclosure is described with reference to FIG. 10 to FIG. 11 below.

Figure 10:
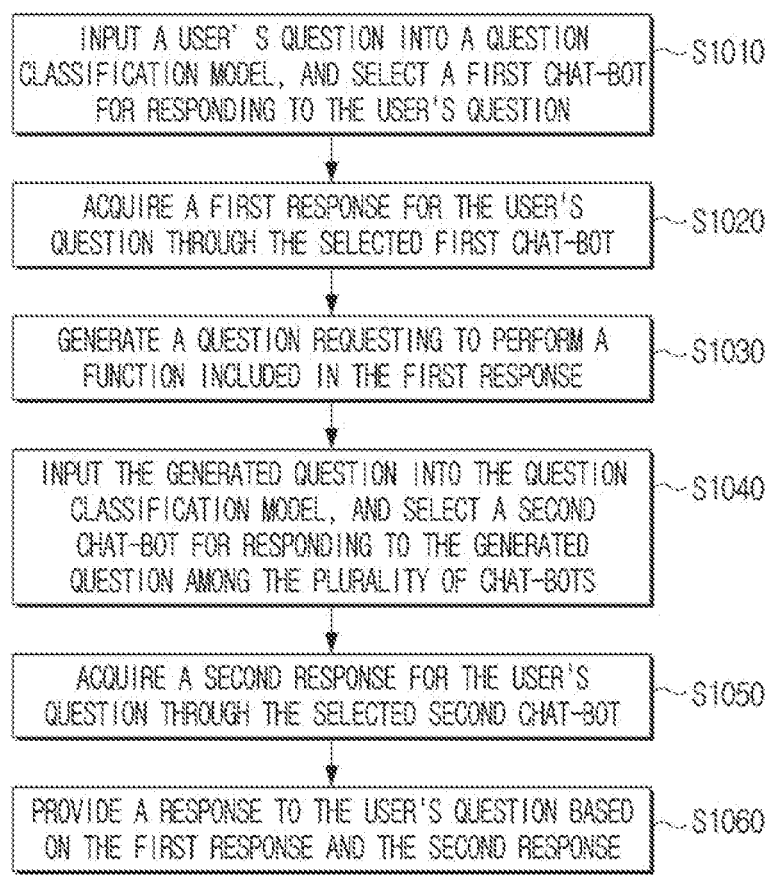
FIG. 10 is a flowchart of a control method of an electronic apparatus according to an embodiment of the disclosure.

FIG. 10 is a flowchart of a control method of an electronic apparatus according to an embodiment of the disclosure.

Referring to FIG. 10, in the control method according to the disclosure, a user's question may be input into a question classification model trained to determine a chat-bot for responding to a question among a plurality of chat-bots, and a first chat-bot for responding to the user's question may be selected among a plurality of chat-bots in operation S1010.

Then, a first response for the user's question may be acquired through the selected first chat-bot in operation S1020.

Through a question classification model, a first domain related to a text included in the user's question may be identified among a plurality of domains.

Here, based on information on the plurality of domains respectively mapped to the plurality of chat-bots, a first chat-bot mapped to the identified first domain may be selected among the plurality of chat-bots.

Then, in the control method, a question requesting to perform a function included in the first response may be generated in operation S1030.

In case information on a function that can be performed at the electronic apparatus is included in the first response, a question requesting to perform the function may be generated.

As an example, in case information on a function was acquired from the acquired first response, it may be determined whether the function is a function that can be performed at the electronic apparatus. Here, in case the function is a function that can be performed at the electronic apparatus, a question requesting to perform the function may be generated.

As another example, in case information on a plurality of functions was acquired from the first response, at least one function that can be performed at the electronic apparatus may be identified among the plurality of functions based on a list regarding functions that can be performed at the electronic apparatus.

Then, a question requesting to perform the identified function may be generated.

As an additional example, a case is assumed, wherein a function selection model trained to, if information on a plurality of functions is input, select a function corresponding to a question among the plurality of functions is included in the memory of the electronic apparatus.

In this case, in the control method, the information on the plurality of functions acquired from the first response, the list regarding functions that can be performed at the electronic apparatus, and the user's question may be input into the function selection model.

As a result, at least one function that corresponds to the user's question and can be performed at the electronic apparatus may be identified among the plurality of functions acquired from the first response.

Meanwhile, in case information on functions that can be performed at the electronic apparatus is not included in the acquired first response, a question may not be generated, and a response for the user's question may be provided just based on the first response.

In case a question was generated through the operation S1030, in the control method, the generated question may be input into the question classification model, and a second chat-bot for responding to the generated question may be selected among the plurality of chat-bots in operation S1040.

In this case, a second domain related to a text included in the generated question may be identified among the plurality of domains through the question classification model.

Then, based on the information on the plurality of domains respectively mapped to the plurality of chat-bots, a second chat-bot mapped to the identified second domain may be selected among the plurality of chat-bots.

In case it was identified that there is no chat-bot for responding to the generated question among the plurality of chat-bots, a response for the user's question may be provided based on the first response.

In case the second chat-bot was selected in the operation S1040, in the control method, a second response for the question previously generated may be acquired through the selected second chat-bot in operation S1050.

Then, based on the first response and the second response, a response for the user's question may be provided in operation S1060.

Based on the first response and the second response, a combined response including a question regarding whether to perform the function included in the first response may be generated.

Then, the generated combined response may be provided. Here, the combined response may be output through the speaker in the form of a voice.

Here, if a user's request for performing the function is input as the combined response is provided, the function may be performed through the second chat-bot.

Figure 11:
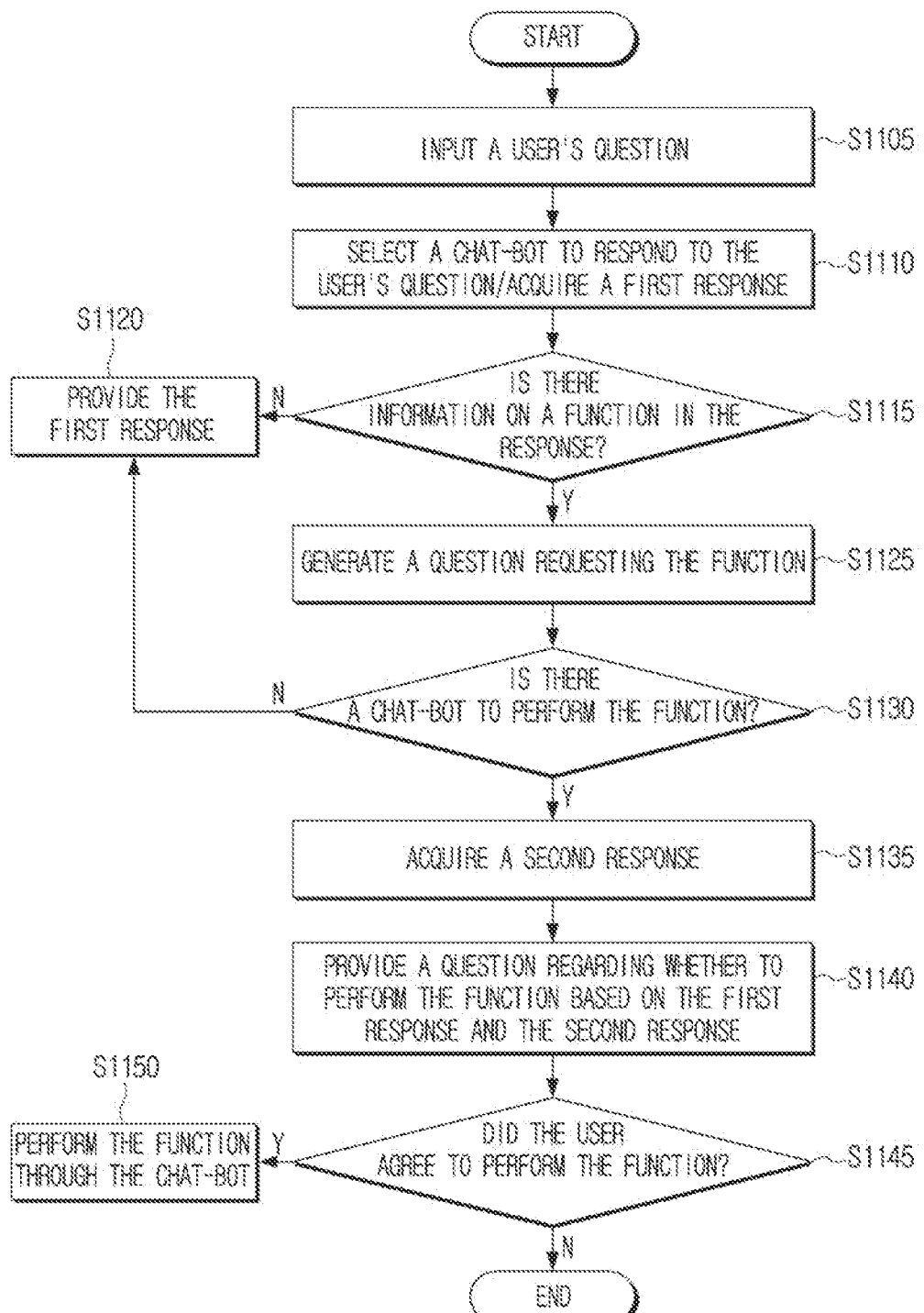
FIG. 11 is a flowchart of a control method of an electronic apparatus according to another embodiment of the disclosure.

FIG. 11 is a flowchart of a control method of an electronic apparatus according to another embodiment of the disclosure.

Referring to FIG. 11, if a user's question is input in operation S1105, a chat-bot to respond to the user's question may be selected, and a first response of the chat-bot may be acquired in operation S1110.

Here, a question classification model trained to select a chat-bot for responding to a question may be used.

Here, it may be determined whether information on a function that can be performed at the electronic apparatus exists in the acquired response in operation S1115.

In case there is no information on a function that can be performed at the electronic apparatus in the acquired response in operation S1115-N, a first response may simply be provided in operation S1120.

In contrast, in case there is information on a function that can be performed at the electronic apparatus in the acquired response in operation S1115-Y, a question requesting the function may be generated in operation S1125.

In case there is information on a plurality of functions in the acquired response, one of the functions may be selected by using a list of functions that can be performed at the electronic apparatus and the user's question. Then, a question requesting the selected function may be generated.

When a question is generated, it may be identified whether there is a chat-bot to perform the function related to the question in operation S1130.

By inputting the generated question into the aforementioned question classification model, a chat-bot to perform the function may be selected.

In case no chat-bot is identified/selected through the question classification model in operation S1130-N, only the aforementioned first response may be provided in operation S1120.

In contrast, in case at least one chat-bot is identified/selected according to the generated question in operation S1130-Y, a second response for the generated question may be acquired through the chat-bot in operation S1135.

Then, a combined response including the question regarding whether to perform the function may be provided based on the first response and the second response in operation S1140.

When the question is provided, it may be determined whether the user agrees to perform the function in operation S1145.

Here, in case the user agrees to perform the function in operation S1145-Y, the function may be performed in operation S1150 through the chat-bot identified in the operation S1130.

In contrast, in case the user does not agree to perform the function in operation S1145-N, the function is not performed.

The control method of an electronic apparatus described through FIG. 9 to FIG. 10 can be performed through the electronic apparatus 100 illustrated and described through FIG. 2 and FIG. 8.

Alternatively, the control method of an electronic apparatus described through FIG. 9 to FIG. 10 can be performed through a system including the electronic apparatus 100 and at least one external apparatus (ex. a server).

The various embodiments described above may be implemented in a recording medium that can be read by a computer or an apparatus similar to a computer, by using software, hardware, or a combination thereof.

According to implementation by hardware, the embodiments described in the disclosure may be implemented by using any one or any combination of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing various functions.

In some cases, the embodiments described in this specification may be implemented as the processor itself. According to implementation by software, the embodiments such as procedures and functions described in this specification may be implemented as separate software modules. Each of the aforementioned software modules may perform at least one function and operation described in this specification.

Computer instructions for performing processing operations at the electronic apparatus 100 according to the aforementioned various embodiments of the disclosure may be stored in a non-transitory computer-readable medium. Computer instructions stored in such a non-transitory computer-readable medium make the processing operations at the electronic apparatus 100 according to the aforementioned various embodiments performed by the aforementioned machine, when the instructions are executed by the processor of the machine.

A non-transitory computer-readable medium refers to a medium that stores data semi-permanently, and is readable by machines, but not a medium that stores data for a short moment such as a register, a cache, and a memory. The aforementioned various applications or programs may be provided while being stored in a non-transitory computer readable-medium such as a CD, a DVD, a hard disk, a blue-ray disk, a USB, a memory card, a ROM and the like.

Also, while embodiments of the disclosure have been shown and described, the disclosure is not limited to the aforementioned embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
at least one memory storing instructions, a plurality of chat-bots for responding to a plurality of questions, a question classification model trained to identify a chat-bot among the plurality of chat-bots for responding to an input question, and information of a plurality of domains respectively corresponding to the plurality of chat-bots; and
at least one processor configured to execute the instructions to:
input the input question into the question classification model, the question classification model outputting a first chat-bot among the plurality of chat-bots for responding to the input question,
through the question classification model, identify a first domain among the plurality of domains that is related to an input text included in the input question,
based on the information of the plurality of domains respectively mapped to the plurality of chat-bots, select the first chat-bot among the plurality of chat-bots that is mapped to the first domain,
acquire a first response for the input question, through the first chat-bot,
based on the first response comprising information of a function of the electronic apparatus that can be performed at the electronic apparatus, generate a generated question requesting to perform the function,
input the generated question into the question classification model, the question classification model outputting a second chat-bot corresponding to a domain of generated text included in the generated question among the plurality of domains respectively corresponding to the plurality of chat-bots for responding to the generated question,
acquire a second response for the generated question, through the second chat-bot, and
provide a combined response to the input question, based on the first response and the second response.

2. The electronic apparatus of claim 1, wherein the at least one processor is further configured to execute the instructions to, based on the first response not comprising the information of the function that can be performed at the electronic apparatus, provide a response to the input question, based on the first response.

3. The electronic apparatus of claim 1, wherein the at least one memory further stores a list of functions that can be performed at the electronic apparatus, and
the at least one processor is further configured to execute the instructions to:
based on the first response comprising plural information of a plurality of functions, identify at least one function among the plurality of functions that can be performed at the electronic apparatus, based on the list, and generate the generated question requesting to perform the at least one function.

4. The electronic apparatus of claim 3, wherein the at least one memory further stores a function selection model trained to, based on the plural information of the plurality of functions being input, select one or more functions among the plurality of functions that corresponds to the input question, and the at least one processor is further configured to execute the instructions to input the plural information of the plurality of functions included in the first response, the list, and the input question into the function selection model, the function selection model outputting the one or more functions among the plurality of functions that corresponds to the input question and can be performed at the electronic apparatus.

5. The electronic apparatus of claim 1, wherein the at least one processor is further configured to execute the instructions to, based on identifying that there is not one among the plurality of chat-bots for responding to the generated question, provide a response to the input question, based on the first response.

6. The electronic apparatus of claim 1, wherein the at least one processor is further configured to execute the instructions to:

based on the first response and the second response, generate the combined response including a question regarding whether the function can be performed, provide the combined response, and based on a request for performing the function being input as the combined response is provided, perform the function, through the second chat-bot.

7. A control method of an electronic apparatus, the control method comprising:

inputting an input question into a question classification model trained to identify a chat-bot among a plurality of chat-bots for responding to the input question, the question classification model outputting a first chat-bot among the plurality of chat-bots for responding to the input question;

through the question classification model, identifying a first domain, that is related to an input text included in the input question, among a plurality of domains respectively corresponding to the plurality of chat-bots;

based on information of the plurality of domains respectively mapped to the plurality of chat-bots, selecting the first chat-bot among the plurality of chat-bots that is mapped to the first domain;

acquiring a first response for the input question, through the first chat-bot;

based on the first response comprising information of a function of the electronic apparatus that can be performed at the electronic apparatus, generating a generated question requesting to perform the function;

inputting the generated question into the question classification model, the question classification model outputting a second chat-bot corresponding to a domain of generated text included in the generated question among the plurality of domains respectively corresponding to the plurality of chat-bots for responding to the generated question;

acquiring a second response for the generated question, through the second chat-bot; and providing a combined response to the input question, based on the first response and the second response.

8. The control method of claim 7, further comprising:

based on the first response not comprising the information of the function that can be performed at the electronic apparatus, providing a response to the input question, based on the first response.

9. The control method of claim 7, further comprising:

based on the first response comprising plural information of a plurality of functions, identifying at least one function among the plurality of functions that can be performed at the electronic apparatus, based on a list of functions that can be performed at the electronic apparatus; and generating the generated question requesting to perform the at least one function.

10. The control method of claim 9, wherein the identifying the at least one function among the plurality of functions that can be performed at the electronic apparatus comprises inputting the plural information of the plurality of functions included in the first response, the list, and the input question into a function selection model trained to, based on the plural information of the plurality of functions being input, select one or more functions among the plurality of functions that corresponds to the input question, the function selection model outputting the one or more functions among the plurality of functions that corresponds to the input question and can be performed at the electronic apparatus.

11. The control method of claim 7, further comprising:

based on identifying that there is not one among the plurality of chat-bots for responding to the generated question, providing a response to the input question, based on the first response.

* * * * *